UNITED STATES PATENT OFFICE.

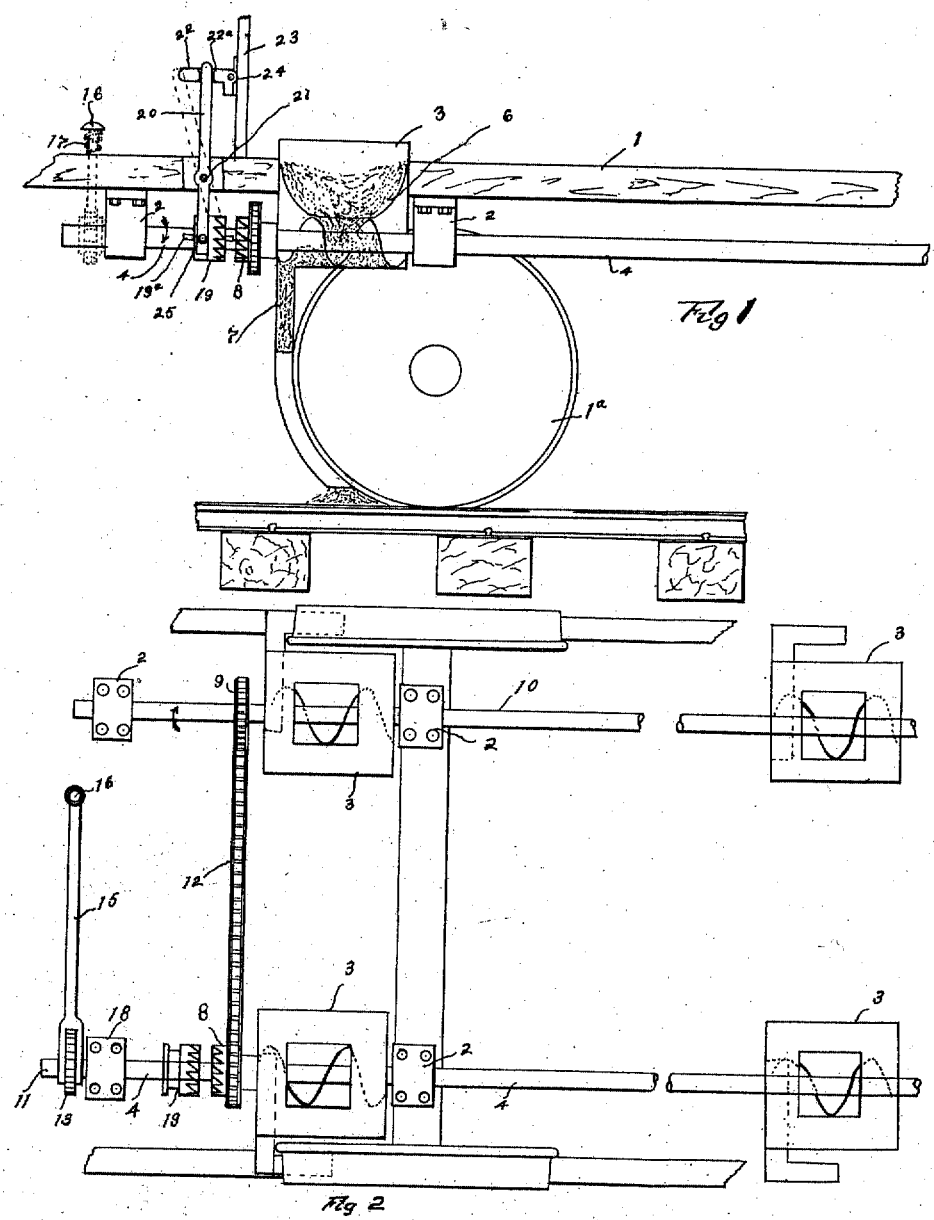

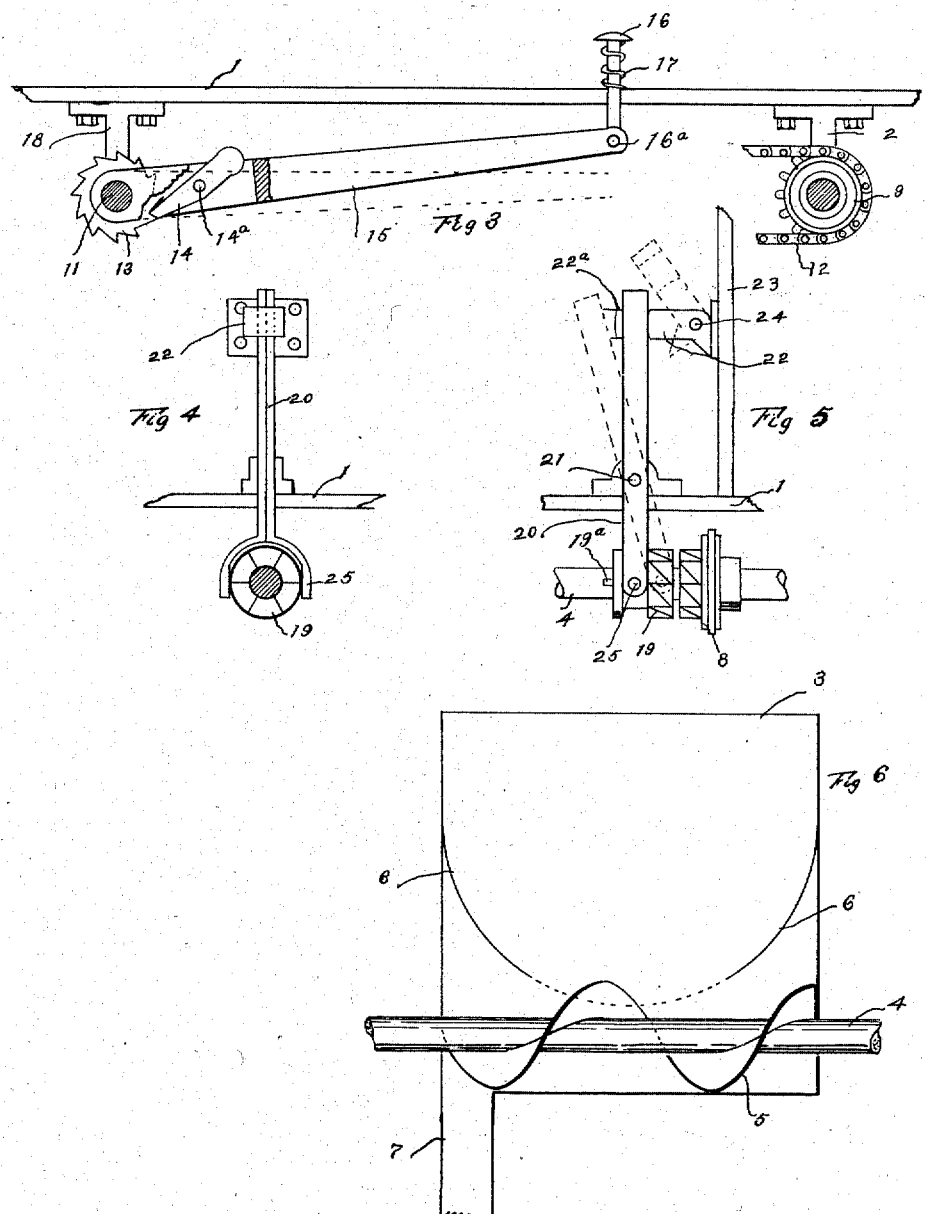

JACOB W. WHITE, OF PUEBLO, COLORADO.

TRACK MANIFOLD SANDING DEVICE.

984,405.  Specification of Letters Patent.  Patented Feb. 14, 1911.

Application filed November 19, 1910. Serial No. 593,240.

*To all whom it may concern:*

Be it known that I, JACOB W. WHITE, a citizen of the United States, residing at Pueblo, county of Pueblo, and State of Colorado, have invented certain new and useful Improvements in a Track Manifold Sanding Device, of which the following is a specification.

My invention relates to a manifold track sanding device and the objects of my invention are, first,—to provide a device for sanding the track adapted preferably to electric motor cars; second,—to provide means for doing the same so that the operator may sand one rail at a time and thus leave the other rail for free electric connection; and, third,—to provide an economical means for the sanding of the rails by the motorman from his station, including other purposes which will appear in the specification.

I attain these objects by the mechanisms illustrated in the accompanying drawings in which,—

Figure 1 is a side elevation in broken section of the floor and truck of a car showing the device attached; Fig. 2 is a top plan view of the device; Fig. 3 is an end view showing the operating lever and sprocket chain connection; Fig. 4 is an end view showing the means of operating the clutch; Fig. 5 is a side view showing the clutch and lever means; and Fig. 6 is a side view of the box and worm.

Similar numerals refer to similar parts throughout the several drawings.

Sand boxes 3 are adjusted in the floor 1 of the car so as to discharge in front of the trucks 1$^a$, and each box is provided with a false bottom 6 slanting downwardly from the sides and ending toward the center and leaving a space therein for the operation above the lower edge of such false bottom of a part of the worm 5 projecting above the false bottom. The shafts 10 and 4 are provided on each side underneath the car in suitable supports 2. Each of these shafts extends through the sand boxes 3 on the respective sides and has attached in each box a worm 5. In each sand box is a discharge pipe 7. On the shaft 4 is the sprocket wheel and clutch 8 in which is turnable the shaft 4 as shown in Fig. 2. On the shaft 10 is the sprocket wheel 9. A sprocket chain 12 operates over the wheels 8 and 9. The bracket 18 sustains the shaft 4 and beyond it on the end 11 of shaft 4 is attached the ratchet wheel 13. The lever 15 is bifurcated at one end and is pivotally attached to the end 11 of the shaft 4, a part on each side of the ratchet wheel 13. Included within the bifurcated portion is the pawl 14 pivotally attached at 14$^a$ and operative on said ratchet wheel 13. The stem 16 is pivotally attached to lever 15 at 16$^a$ and the top is extended forming a shoulder for operation with the foot above the car floor. A spiral spring 17 is provided operative on the floor 1 and the shoulder of the stem 16. The clutch 19 is placed on the shaft 4 provided with an element engaging a slot 19$^a$ in said shaft. The lever 20 is pivotally attached to the floor 1 at 21 with fingers pivotally attached to the clutch 19 on a strap thereon at 25. The catch 22 is pivotally attached to the upright portion of the car 23 at 24 and is provided with slot means 22$^a$ to engage the top of the lever 20.

From practical experience it is ascertained that in the sanding of tracks for electric motor cars the sand tends to insulate the car wheels from the rails, and decreases the effectiveness of the motors because of the sand acting as insulation and breaking the ground current. With my device when the sand boxes are all filled the motorman may operate these boxes on the fixed shaft 4, or on one side of the car, and the shaft 10 will be actuated; and when the sand in the boxes on shaft 4 has been exhausted, or for any other reason it is desired to use sand out of the boxes on shaft 10 on the other side of the car, by throwing the lever 20 the clutch 19 will engage the clutch portion 8, and, as the ratchet 19 is fixed to the shaft 4, it will operate, by means of the sprocket chain and sprocket wheels, the shaft 10 and the sand from that side of the car may be used. By this means I provide a device operative with the foot, and avoid the necessity of the motorman using his hands, that may be otherwise engaged. The worm on the shafts in the bottom of the box extending above the false bottom brings the sand down into the worm and discharges it through the pipe in front of the trucks 1$^a$. It will be seen that my device attains the purpose of sanding only one rail at a time, or both rails at the same time, if desired; and that a sand box and discharge pipe may be placed in front of each truck.

I claim,—

In a manifold track sanding device of the character described, comprising shafts attached to each side of and beneath the car, sand boxes in front of the trucks upon the car adjusted on said shafts and provided with discharge pipes, a worm attached to each shaft operative in the bottom of each box, a false bottom in each box adapted to permit the worm to extend above the lowest portion of such false bottom, a sprocket wheel on each shaft with a sprocket chain operative thereon, a clutch means attached to one of said shafts operative on an adjustable sprocket wheel, lever means adapted for the operation of said clutch from the car floor, and a ratchet wheel attached to one of said shafts constituting a drive shaft, a lever and pawl means adapted to drive said ratchet wheel provided with spring means and means for a foot operation thereof, all substantially as set forth.

Witness my signature.

JACOB W. WHITE.

Witnesses:
C. M. WALKER,
LEW MOCH.